United States Patent [19]
Pierson

[11] 3,708,740
[45] Jan. 2, 1973

[54] DEVICE FOR PRODUCING A LARGE DIRECT-CURRENT POTENTIAL DIFFERENCE

[75] Inventor: Alexandre Pierson, Biviers, France

[73] Assignee: Commissariat A l'Energie Atomique, Paris, France

[22] Filed: Jan. 4, 1972

[21] Appl. No.: 215,381

[30] Foreign Application Priority Data

Jan. 15, 1971 France..................................7101356
Dec. 3, 1971 France..................................7143497

[52] U.S. Cl.......................................321/8 R, 321/15
[51] Int. Cl................................................H02m 7/00
[58] Field of Search.......................................321/8, 15

[56] References Cited

UNITED STATES PATENTS

| | | | |
|---|---|---|---|
| 3,234,451 | 2/1966 | Diebold | 321/8 R |
| 3,248,636 | 4/1966 | Colaiaco | 321/8 R |
| 3,372,325 | 3/1968 | Wahlgren | 321/8 R |
| 3,460,022 | 8/1969 | Riley | 321/8 R |
| 3,502,956 | 3/1970 | Fries et al. | 321/8 R |
| 3,582,753 | 6/1971 | Levon et al. | 321/8 R |
| 3,568,035 | 3/1971 | Pierson | 321/15 |

Primary Examiner—William M. Shoop, Jr.
Attorney—William B. Kerkam, Jr.

[57] ABSTRACT

The device comprises at least one conductive rod forming a transfer winding supplied from an alternating-current source and cells arranged in tiers along each rod and each consisting of a closet magnetic-circuit body surrounding each rod, a secondary winding inductively coupled to the transfer winding and a rectifier. Each cell constitutes a module comprising a support plate having a set of aligned holes through which the conductive rod or rods are passed.

23 Claims, 13 Drawing Figures

DEVICE FOR PRODUCING A LARGE DIRECT-CURRENT POTENTIAL DIFFERENCE

The invention is concerned with a device for producing a large direct-current potential difference which can exceed several hundreds of kilovolts from an alternating-current source, wherein said device can be associated with an insulating transformer in order to transmit an electric power from one potential level to the other. The U.S. Pat. No. 3,568,035 describes and claims a device of this type comprising: a transfer winding supplied by said source and preferably constituted by a single conductive loop and a plurality of cells each comprising a secondary winding coupled inductively to said transfer winding and a rectifier circuit supplied by said secondary winding, the outputs of the rectifiers of said cells being placed in series in order to produce at the terminals of the assembly of rectifiers a potential difference equal to the sum of potential differences supplied by the cells.

The aim of the present invention is to provide a device for producing a direct-current potential difference of the type defined in the main patent which satisfies all practical requirements more effectively, particularly by virtue of the fact that it is both of simple design and easy to construct.

To this end, the invention proposes a device which comprises at least one conductive rod forming a conductive transfer loop connected to a low-voltage alternating-current supply, said cells being arranged in tiers along each conductive rod, and each cell being provided with a closed magnetic-circuit body around each rod, a secondary winding having a large number of turns mounted on said magnetic-circuit body and a rectifier, and the rectifier outputs being connected in series, and which is primarily characterized in that each cell constitutes a module comprising a support plate provided with a first set of aligned perforations through which the conductive rod or rods are permitted to pass.

In accordance with a first embodiment of the invention, each rod has a hairpin shape and is provided with an electric insulator. Each plate is provided with a second set of perforations for the insertion of rods which serve to align the plates and are isolated therefrom, and compression means whereby said support plates which are separated by isolating spacer members are clamped together and against a base support fitted with leak-tight lead-in bushings for the ends of each arm of one conductive rod, said base support being such as to constitute the bottom of a tank which surrounds the cells and contains an electrically insulating gas.

A generator according to a second aspect of the invention comprises two conductive rods provided with an electrical insulator and shaped so as to form an open loop with two arms each having a free extremity, two free extremities each forming part of one loop being connected to each other and to one of the poles of a three-phase low-voltage supply, the two other poles of which are connected respectively to the two remaining free extremities, and comprises a plurality of cells arranged in tiers along each conductive rod, each cell being provided with a magnetic-circuit body coupled to the assembly of arms, three secondary windings having a large number of turns mounted on said magnetic-circuit body and a rectifier, the body of each magnetic circuit being at the potential of one point of the rectifier which is associated therewith and the outputs of the rectifiers being connected in series.

A device according to another mode of application of the invention comprises a leak-tight tank which is intended to receive an insulating gas, and is characterized in that it comprises in combination: at least one straight bare rod of material having good electrical conductivity, said rod being contained at least partially within the tank and constituting with a solid bare return conductor a single-turn primary winding connected to a low-voltage alternating-current supply; and a plurality of cells arranged in tiers along the bare rod (or rods), each cell comprising a closed magnetic-circuit body around the rod (or each rod), a secondary winding having a large number of turns mounted on said magnetic-circuit body and a rectifier circuit, the outputs of the rectifiers being connected in series. Advantageously and as in the previous cases, the magnetic-circuit body is connected to an electrical potential which is close in value to one of the output potentials of the associated rectifiers.

This last-mentioned arrangement makes it possible to avoid the presence of a solid insulator provided on at least part of the looped conductor in the arrangements in accordance with the two first embodiments and to carry out the insulation of said conductor by means of the gaseous atmosphere which surrounds this latter, thus eliminating any creeping along the insulator which makes it difficult to maintain the voltage and removing the problems of shaping a rod provided with a solid insulator of substantial thickness.

According to one advantageous mode of application of the invention, each cell constitutes a module which can be removed as a single unit and comprises a support plate provided with a perforation (or a set of perforations) enabling the conductive rod (or rods) to pass therethrough and having a sufficient diameter to ensure insulation by means of the gas ring between the rod and the support plate. A guard ring is preferably carried by the support plate around the rod or around each rod.

When the device is intended to be supplied with three-phase current, provision is advantageously made for two bare conductive rods and each cell comprises three secondary windings each placed around one arm of a magnetic circuit which completely surrounds the two rods, the return of alternating-current being carried out through a conductor which is connected to the rods.

The cells are advantageously supported by a beam of insulating material which is secured to one of the walls of the tank. This beam preferably has a cross-section in the shape of an inverted U, the bottom of which is parallel to the rod or rods, the plate of each cell being engaged within supporting grooves of the insulating beam, thereby making it possible to withdraw the cell assembly as a single unit by causing this latter to slide within the grooves after having removed the rods. After erection, the beam is completed by a detachable cover which is located opposite to the bottom of the U and serves to maintain the cells in position. The return conductor advantageously passes between the wall of the tank and the beam on which the electric connections are permanently placed.

A better understanding of the invention will be gained from the following description of generators constituting embodiments which are given by way of example, reference being made to the accompanying drawings, in which.

Figure 1:
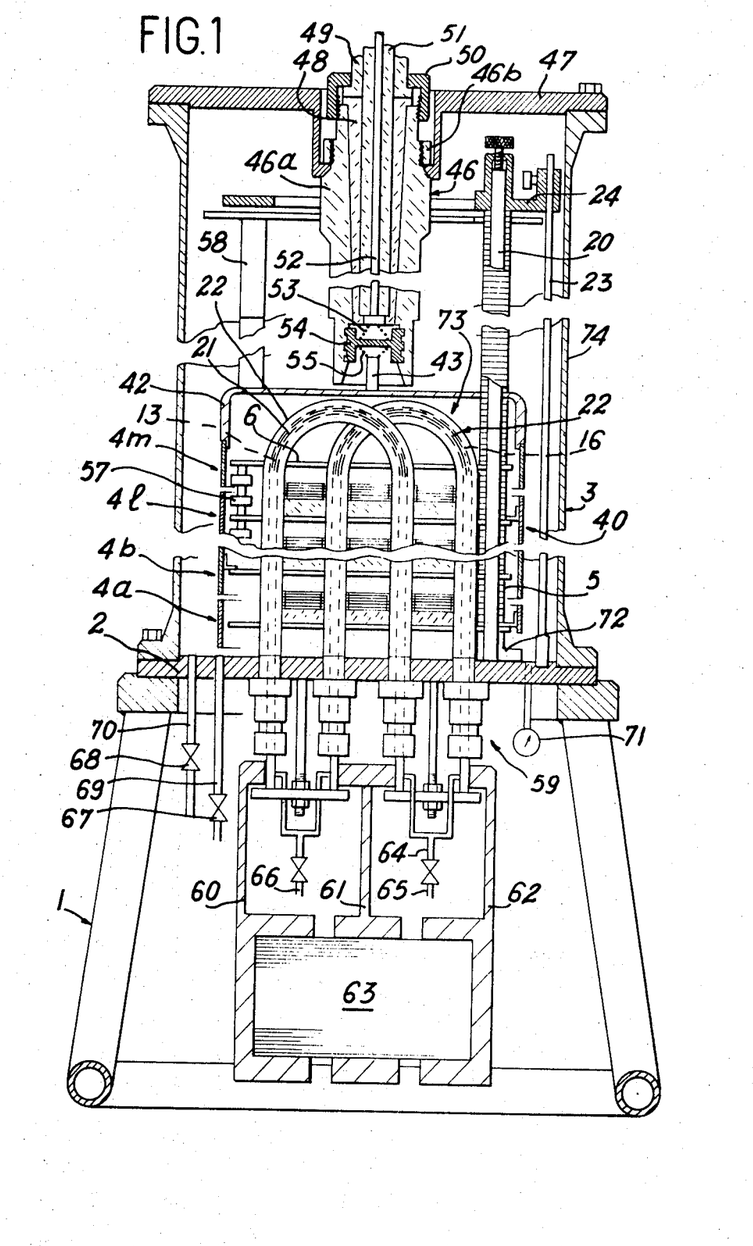
FIG. 1 is a diagrammatic axial sectional view of the generator.
Figure 2:
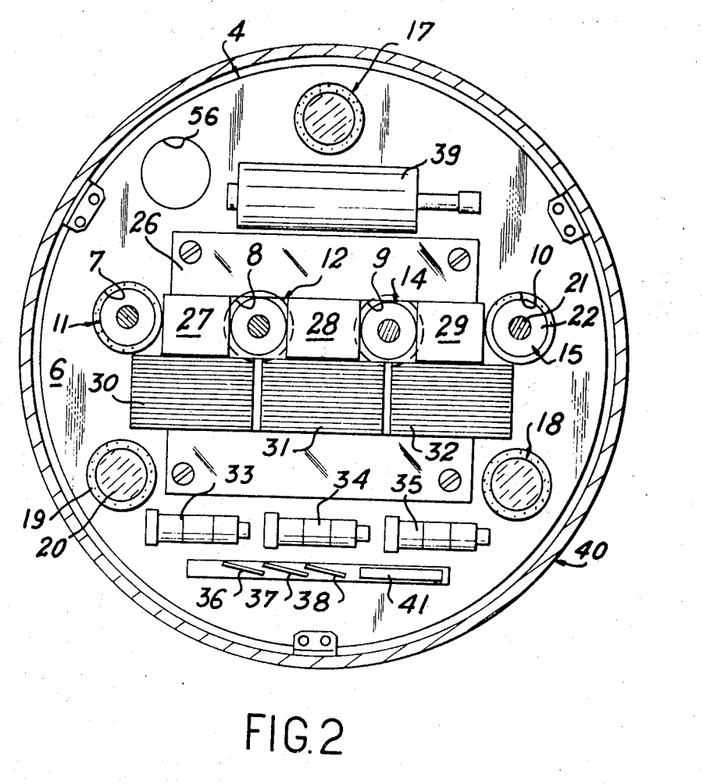
FIG. 2 is a top view of a modular element of the generator of FIG. 1.
Figure 3:
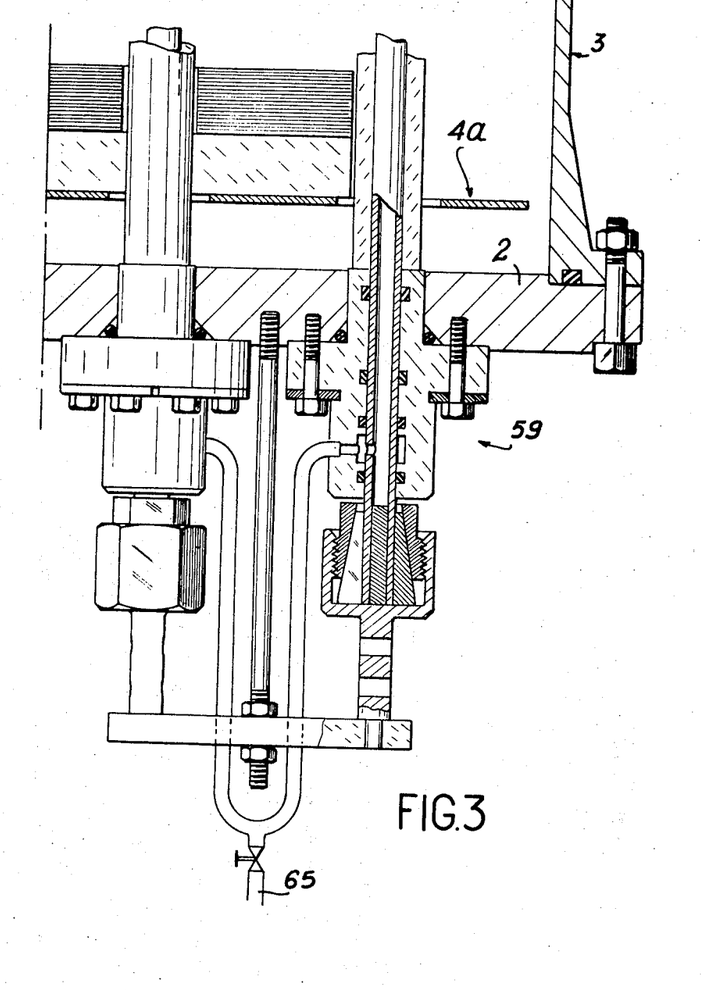
FIG. 3 is a detail view of FIG. 1.

The generator according to the invention as illustrated in FIGS. 1 to 3 comprises a tubular frame 1 which rests on the ground and supports the bottom wall 2 of a tank 3. Said tank 3 contains a plurality of modular elements 4a, 4b, . . . , 4m which are generally designated by the reference 4, which are placed vertically one above the other and separated from each other by the isolating spacer members 5.

Each modular element comprises a support plate 6. This plate is provided with four drilled holes or perforations 7, 8, 9 and 10, the first and third perforations being provided for the arms 11 and 14 of a hairpin rod 13, the second and fourth perforations being provided for the arms 12 and 15 of a second hairpin rod 16. The support plate is also provided with three drilled holes or perforations 17, 18 and 19 disposed at angular intervals of 120° (as shown in FIG. 2) for the insertion of guide rods 20. The conductive rods 13 and 16 are formed of a conductive core 21 embedded in an insulator 22 having a sufficient thickness to withstand the potential difference between the high voltage and ground (earth). The stack of modular elements 4 and of spacer members 5 is clamped by means of tie-rods 23, the upper portion of which is applied against a pressure ring 24 and the lower portion of which is applied against the bottom wall 2 of the tank 3.

Figure 4:
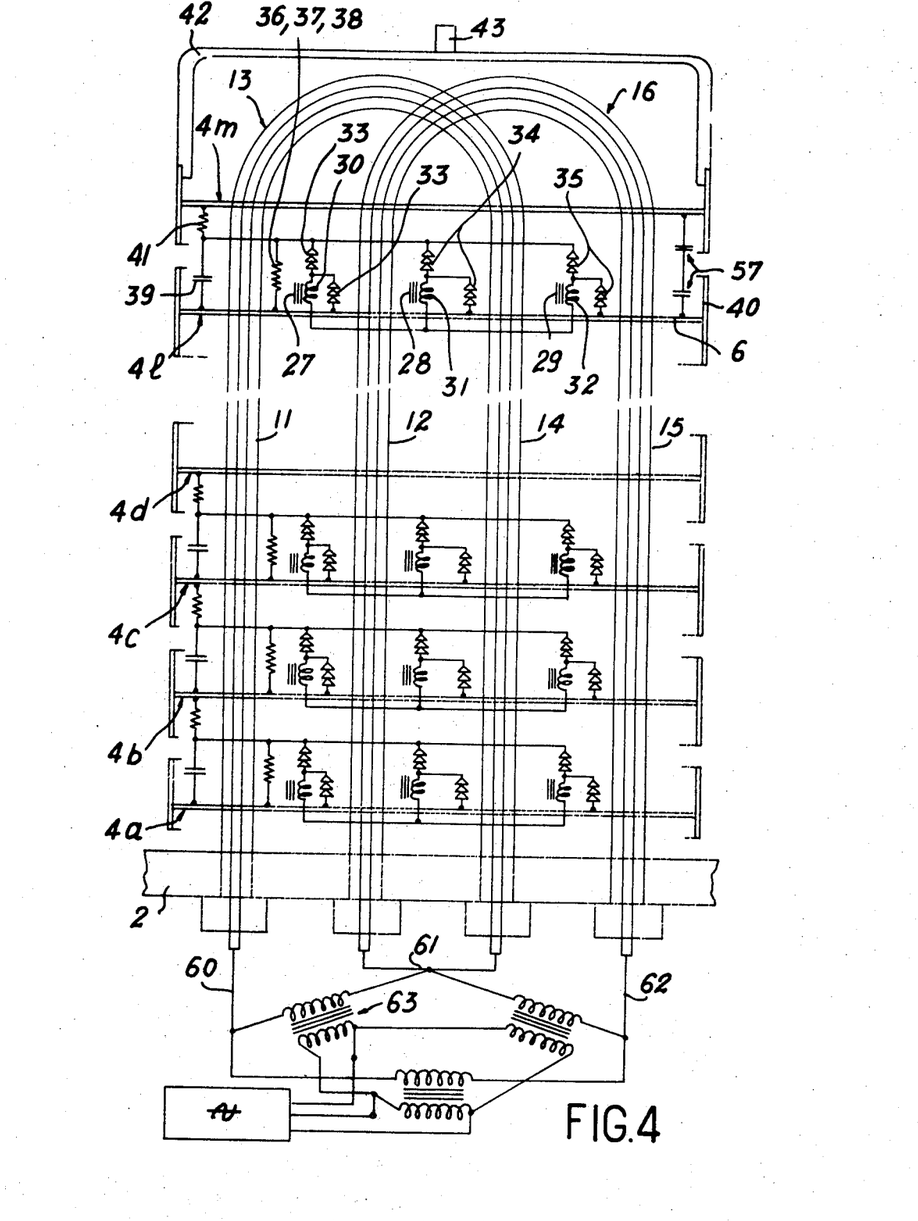
FIG. 4 is a schematic electrical diagram of the generator of FIG. 1.

Each support plate 6 is formed of non-magnetic metal such as aluminum, for example, and carries a magnetic-circuit frame or body 26 having three arms 27, 28 and 29 for three secondary star-connected windings 30, 31 and 32 having a large number of turns and associated with rectifying means constituted by silicon diodes 33, 34 and 35 which are connected electrically in accordance with the so-called Graetz bridge arrangement (FIG. 4) and with smoothing means constituted by a capacitor 39 having a capacitance which is usually of the order of a few tens of nanofarads.

Resistors 36, 37 and 38 (each having a value of a few megohms) which are connected in series discharge the smoothing capacitors 39 when the generator is no longer energized. These resistors also prevent operation on no load which could result in voltage unbalance between the different modular elements, this being in turn liable to lead to flash-over at the level of the insulators. A resistor 41 having a value of at least several thousand ohms which is capable of dissipating high instantaneous power and the capacitor 39 connect two superposed plates electrically; the resistor 41 limits the accidental short-circuit current of the machine to a sufficiently low value to ensure that the diodes 33 are not damaged during the time interval which is necessary for triggering the protection system (not shown) while at the same time ensuring the slow discharge of the capacitor 39 which is charged to the voltage of one tier. The assembly of resistors 41 advantageously replaces the conventional general protective resistor which is usually connected at the output of the generators.

Each support plate 6 is brought to an output potential of the rectifier circuit which is associated therewith (namely an output either to the following rectifier or to the preceding rectifier, for example) and the different rectifiers are connected in series from one modular element to the next, the bottom plate 4a being at ground (earth) potential. In order to prevent the edges of the support plates 4 and especially those of the support plates which are at the highest potential from producing a brush discharge, a guard ring 40 is added thereto.

The plate which is at the highest potential (namely the plate 4m) is surmounted by a dome 42 in contact with a metallic end-piece 43 of a high voltage lead-in bushing 45 constituted by an insulating sleeve 46 and a conical body 48. The sleeve 46 has an annular shoulder 46a which cooperates with a ring 46b in order to grip in leak-tight manner a flange of a cover 47 of the tank 3. The body 48 engages within the sleeve and is securely maintained therein by means of an abutment shoulder 49 and a lock-nut 50 in order to clamp the extremity of a high-voltage output cable 51. At that extremity which is inserted in the dome, an electric conductor 52 of the cable 51 comes into contact with a spring 53, then by means of a conductive wall 54 with a second spring 55 and, through this latter, with the end-piece 43.

Between the support plates which have the highest potential are connected distribution capacitors 57 which ensure suitable distribution of the potentials in the event of rapid variation of the output voltage as a result of a short-circuit. Between the dome 42 and the pressure ring 24 is connected a resistor 58 for measuring the high voltage supplied, this resistance being in the form of a plate and having a value of several thousand megohms.

The lower extremities of the arms 11–14 and 12–15 of the rods 13 and 16 pass within four leak-tight bushings 59 and their free extremities are connected to three connection bars 60, 61 and 62 of a low voltage three-phase transformer 63. The transformer can be supplied by an autotransformer which permits variations from 0 to 220 volts in order to permit ready adjustment of the output high-voltage. The conductive cores 21 of the hairpin rods 13 and 16 are hollow (as shown in FIG. 3) and one of the extremities of each rod is connected by means of a valve 64 to a pipe 65 for the supply of cooling fluid whilst the other extremity is connected to a discharge pipe 66. Valves 67 connect the tank 3 to tubes 69 and 70 for admission and discharge of an insulating gas (such as sulphur hexafluoride, for example) and a pressure-gage 71 serves to ascertain that this gas is in fact present under the requisite pressure.

The operation of the generator which has just been described in similar to that of the device according to the first certificate of Addition which has already been mentioned: high-intensity three-phase currents flow through the rods 13 and 16 and ensure the supply of the magnetic-circuit frames 26 and the appearance of alternating-current voltages at the terminals of the secondary windings 30, 31 and 32, these voltages being rectified and put in series individually.

Figure 6A:
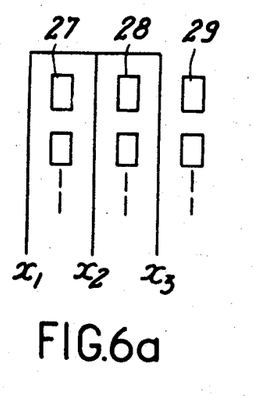
FIGS. 6a, 6b and 6c are electrical diagrams.
Figure 6B:
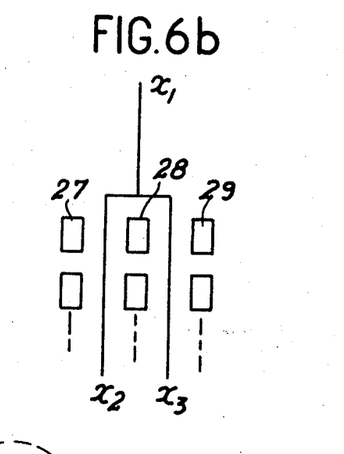
Figure 6C:
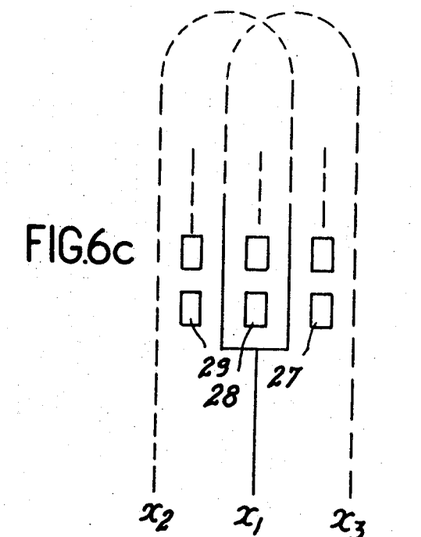

Reference will now be made to FIGS. 6a, 6b and 6c which explain the change-over from the electric circuit arrangement of the three-phase generator as described and illustrated in FIG. 6 of the main patent (FIG. 6a) to the arrangement of the three-phase generator in accordance with the present Addition (as shown in FIG. 6c).

In FIG. 6, the references $x_2$ and $x_3$ designate the two vertical rods, $x_1$ designates the return conductor (in fact constituted by the metallic casing which contains the entire circuit), the references 27, 28 and 29 designate as before, the three arms of a three-phase magnetic circuit, there being as many magnetic circuits as there are cells in series within the very-high-voltage generator. If the rods $x_1$, $x_2$ and $x_3$ are deformed so as to give them the configuration of FIG. 6b and if there is carried out in this FIG. 6b a rotation through an angle of 180° followed by an extension of the conductors $x_2$ and $x_3$ as indicated in FIG. 6c, nothing has changed from an electrical standpoint. FIG. 6c which gives the configuration of the system in accordance with the present Addition is therefore electrically equivalent to FIG. 6a which gives the configuration in accordance with the main patent.

The assembly of a generator is a particularly simple operation. The modular elements 4 are stacked successively on the bottom wall 2 while interposing the spacer members 5, whereupon the guide rods 20 are inserted and received at the lower ends thereof by feet 72. The arms of the rods 13 and 16 are then engaged whilst the looped portion 73 remains free. It is then possible to place in position and fix on the bottom wall 2 a tank body 74, the tank cover 47, then to place in position and connect-up the transformer 63.

By way of example, a generator of the type described and illustrated in FIGS. 1 to 3 and employing an alternating-current source at industrial frequency comprises twelve superposed modular elements 4, each element being capable of delivering a continuous voltage of 25 kV, namely an output voltage of 300 kV, said elements being disposed within a tank having a height of 130 cm and a diameter of 60 cm. Three-phase supply transformer 63 has a power rating of 10 kVA, an input voltage of 220 volts and an output voltage of 12 volts. The cores 21 of the rods 13 and 16 are of copper and carry on no-load a magnetizing current of approximately 180 A and on full load a current of the order of 850 A. The resistors 41 have a value of 15,000 ohms and the capacitors 57 have a capacitance of 1000 pF.

Figure 5:
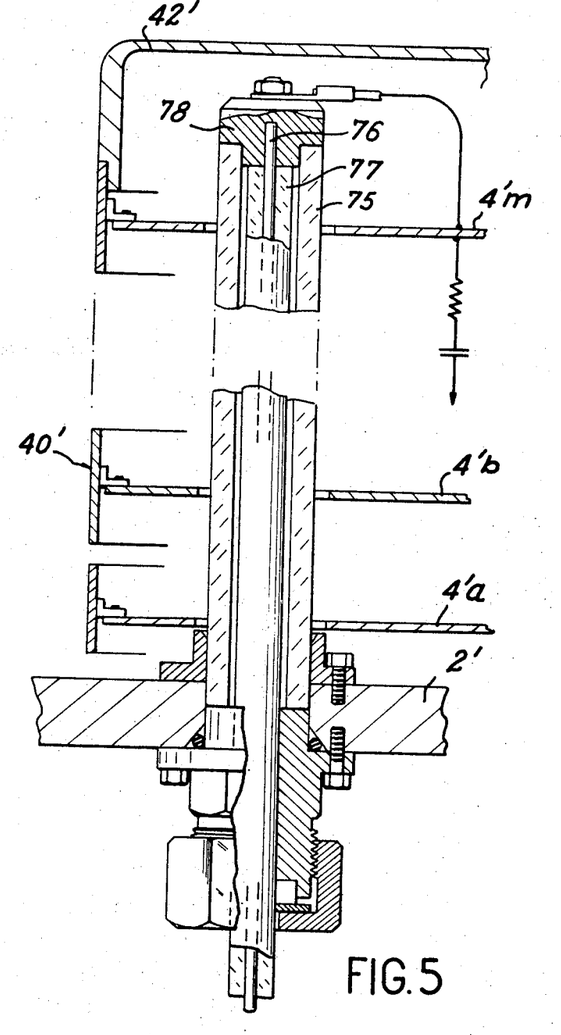
FIG. 5 shows a detail of an alternative embodiment.

In an alternative form of execution which is illustrated in FIG. 5, the generator comprises a high-voltage output through the bottom wall 2. This wall is fitted with an insulating tube 75 which is traversed by a conductor cable 76. The cable is fitted with an insulating sheath 77 of substantial thickness and is also separated from the plates by the tube 75 which passes within perforations formed for this purpose in the plates. The top end of the insulating tube 75 carries a contact-piece 78 which is connected to the conductor and to the top plate. For the sake of greater clarity, the elements of FIG. 5 which correspond to those already illustrated are provided with the same reference numeral to which is assigned the prime index.

The device according to FIGS. 1 to 5 makes use of thin rods of a solid insulator; on the contrary, the rods of the embodiment shown in FIG. 7 to 11 are insulated by the surrounding gas.

Figure 7:
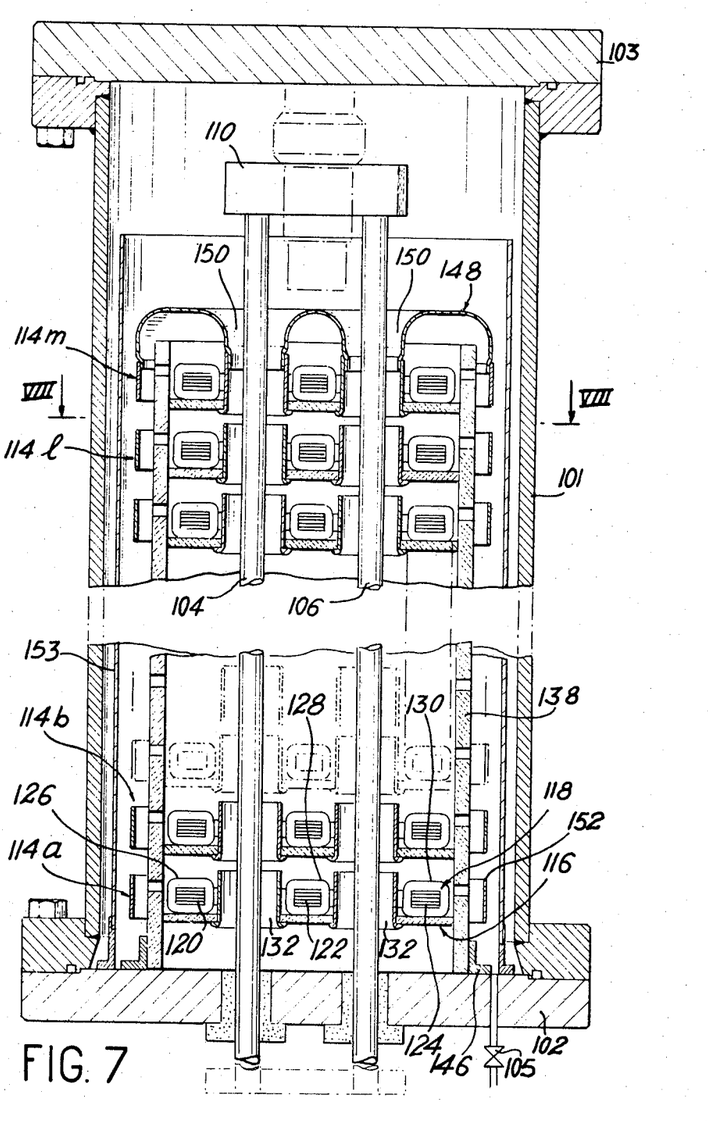
FIG. 7 is a diagrammatic view of a generator constituting yet another embodiment, this view being taken in cross-section on a plane which passes through the axis and the two insulated rods.
Figure 8:
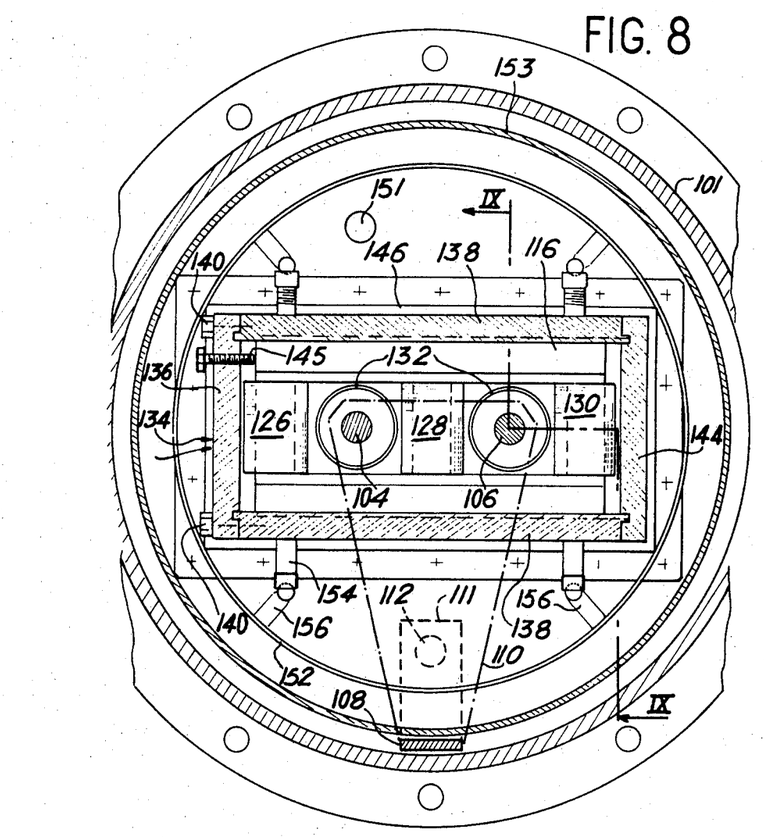
FIG. 8 is a top view of a modular element of the generator of FIG. 7, this view being taken in cross-section along line VIII—VIII of FIG. 7.
Figure 9:
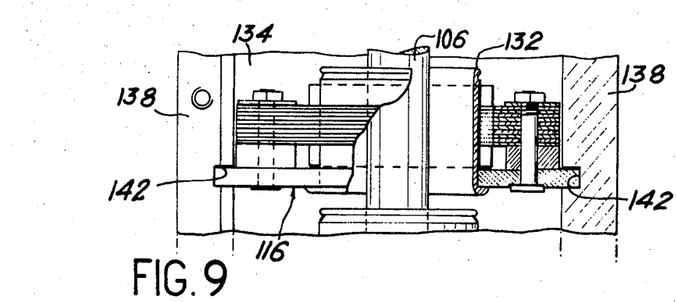
FIGS. 9 and 10 are detail views of FIG. 7, showing the guides for the withdrawal of a cell and showing the cell in the course of withdrawal.
Figure 10:
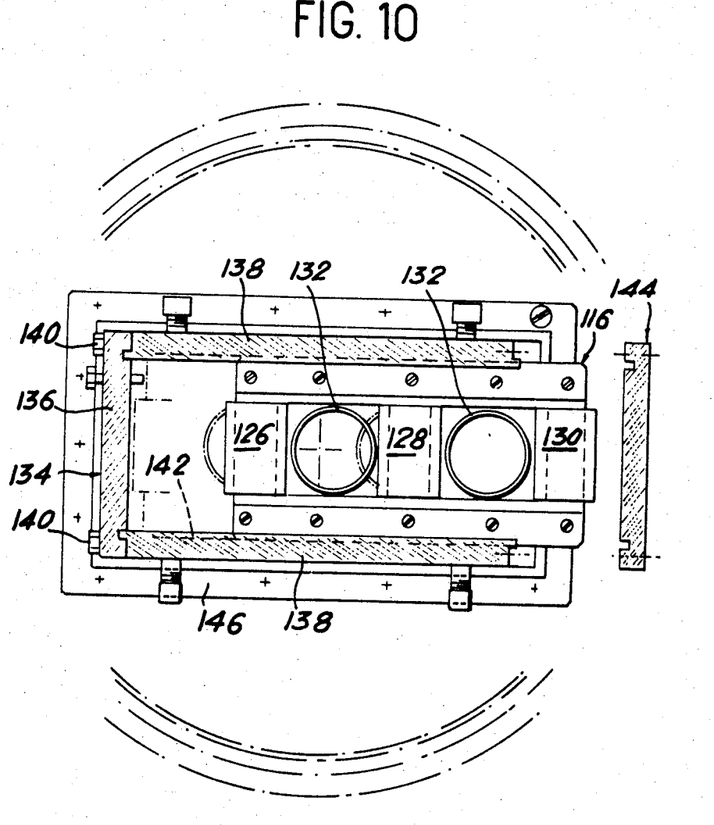

FIGS. 7 to 9 show a high-voltage electric generator comprising a cylindrical tank 101 which is closed in leak-tight manner by a bottom wall 102 and by a top closure plate 103 which are secured by means of bolts. The tank 101 is provided with an admission pipe fitted with a valve 105 for introducing therein a gas having a high dielectric strength (such as sulphur hexafluoride, for example) under a pressure which may be higher than atmospheric pressure. A pressure gage (not shown in the drawings) serves to ensure that the requisite pressure is attained.

Figure 11:
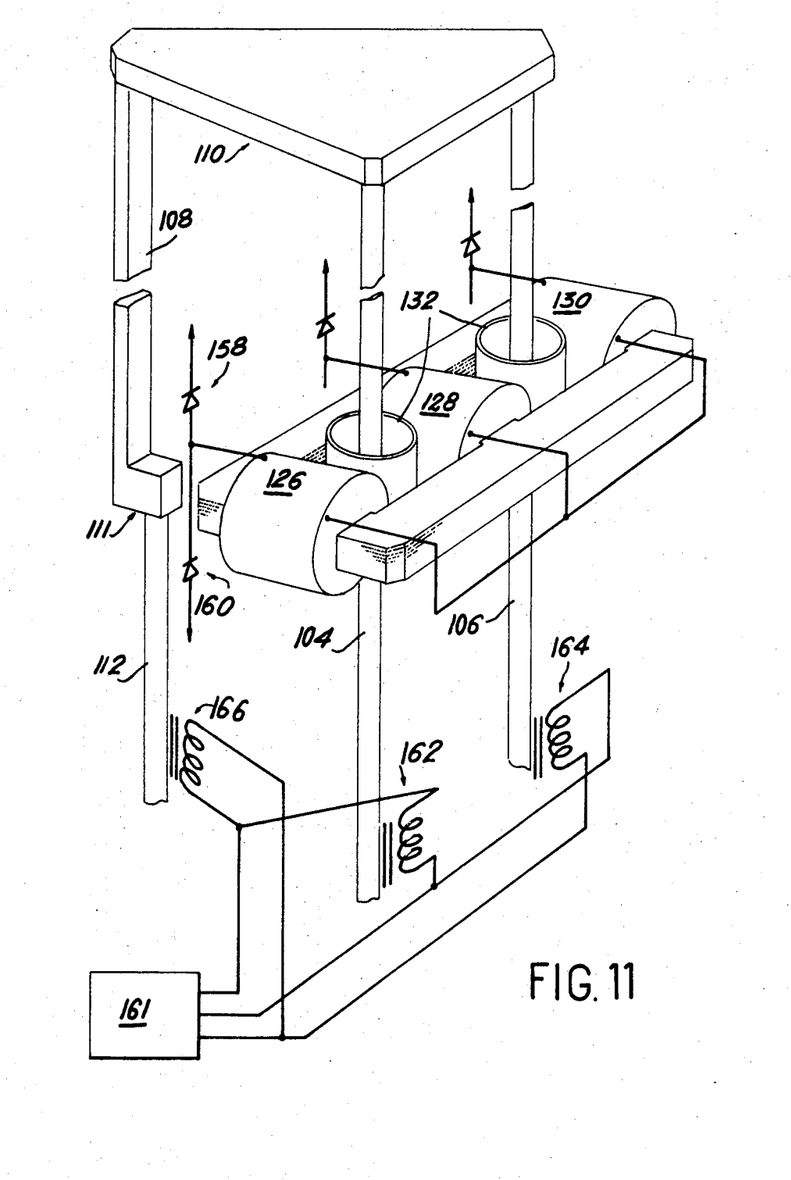
FIG. 11 is a schematic electrical diagram of the generator of FIG. 7.

The device as illustrated which is intended to operate on a three-phase supply, comprises two straight and parallel rods 104 and 106 of material having good electrical conductivity which penetrate into the tank through leak-tight insulating sleeves in the bottom wall 102. The rods 104 and 106 are solid and bare and electrically isolated from the other elements contained in the tank by the gas which is present within this latter and which also removes the heat dissipated by Joule effect within the rods while making it possible to avoid the use of rods pierced by a duct for the circulation of coolant liquid. It should be noted that this gas is capable of withstanding in the vicinity of the rods a much higher temperature than a conventional insulator of a high-voltage conductor (usually impregnated paper), thereby permitting a much higher current density within the rods. The conductor which serves to return the alternating current supplied to the rods 104 and 106 is constituted by a flat conductor 108 (as shown in FIGS. 8 and 11) which is connected to the rods by means of a triangular yoke 110 (shown in FIG. 7). The lower extremity of the flat return conductor 108 is connected by means of a right-angle bracket 111 to an output pin 112 which passes through the bottom wall 102 within a leak-tight and insulating sleeve (not shown). Since the rods 104 and 106 and the return conductor are at the mean ground (earth) potential in the same manner as the tank and carry a low-voltage alternating current, the output sleeves of the pin 112 and of the rods 104 and 106 need only withstand a low voltage and are of small size.

There are placed within the tank a number of superposed modules constituting a corresponding number of tiers each supplying a fraction of the direct-current high voltage of the generator. Since these modules which are each generally designated by the reference 114 followed by the index $a, b, \ldots m$, are all practically identical, only the tier 114a will be described in detail. This tier is constituted by a module which can be removed as a single unit, comprising a support plate 116 of insulating material such as synthetic resin reinforced with glass fiber, for example, and pierced by two holes through which the rods 104 and 106 are intended to pass. The support plate 116 carried a magnetic-circuit frame 118 which completely surrounds the rods 104 and 106 and is formed of material having high magnetic permeability. The three transverse arms 120, 122 and 124 of the frame 118 each carry a secondary winding having a large number of turns 126, 128 or 130. These three windings are star-connected and associated with rectifying means (silicon diodes, for example) which are connected so as to constitute a Graetz bridge circuit, for example. The electric circuit arrangement will be described in detail hereinafter.

By reason of the absence of solid insulator between the rods 104 and 106 on the one hand and the support plate 116 on the other hand, this plate is advantageously provided around each rod with a tubular guard ring 132 which projects from the plate to a level which is located beyond the level of the windings 26, 28 and 38.

The cells 114a, 114b, ... 114m can be maintained in position with respect to each other by means of a number of different methods. It is, however, particularly advantageous to employ the support structure as illustrated in FIGS. 7 to 10 and constituted by a vertical beam 134 which can be considered as having a portion of U-shaped cross-section and a cover, both of these latter being formed of insulating material which affords effective resistance to creeping. It is possible in particular to employ the same material as for the support plates. The U-shaped portion is constituted by a number of assembled parts. This portion comprises an end-plate 136 and two parallel flanges 138. The flanges are secured to the end-plate 136 by means of screws 140. In the flanges 38 are formed groves 142 (shown in FIGS. 9 and 10) in which slide the edges of the support plate 116 of each cell 114a, 114b, ... 114m. Once the plates are in position, a cover 144 which is similar to the end-plate can be fixed on the flanges 138 at the end remote from the end-plate 136. In order to prevent any vibration, provision can be made for fixing screws 145. The end-plate, the flanges and the cover of the beam 134 are secured to the bottom wall 102 by means of a bolted frame 146.

The top plate 114m which is brought to the highest direct-current voltage with respect to ground (earth) is provided with a high-voltage dome 148 (shown in FIG. 7) to which is connected a high-voltage output by means of the cover 103; said output is shown in chain-dotted lines and will not be described since it can be of any conventional type. This high-voltage output can in particular be similar to that which has been described with reference to FIG. 1. The dome has two depressed portions 150 which are intended to fit within the shielding rings of the cell 114m. Provision can also be made for a high-voltage output through the bottom wall, comprising an insulated cable contained within an insulating tube, the top end of said cable being connected electrically to the dome by means of a gas-tight metallic plug; the insulating tube passes through the bottom wall 102 of the tank through a leak-tight bushing 151 (FIG. 8).

The flat return conductor 108 is placed near the cylindrical wall of the tank 101 (FIG. 8) outside a skirt 153 which is carried by the bottom wall 102 and connected to ground (earth), said skirt being intended to prevent surge effects.

There is associated with each cell an equipotential guard ring 152 having the same function and placed around the beam 134. This ring is fixed on the support plate 116 of the corresponding cell by means of four mechanisms each constituted by a push-rod 154 which passes through one flange 138 of the beam and by a lug 156 carried by the ring 152 and terminating in a ball which comes into position within a terminal cup of the push-rod. In the embodiment which is illustrated, only two push-rods out of the four are actuated for locking purposes. To this end, said push-rods are made up of a threaded rod and an internally-threaded cap fitted with the cup. In order to release a ring, it is only necessary to slacken-off the two caps and thus to free the balls.

The electrical diagram of the device can be very similar to that described in the application for a second certificate of Addition which has already been mentioned. The arrangement is indicated diagrammatically in FIG. 11, in which only one cell is shown. The three secondary windings 126, 128 and 130 of the cell are star-connected and associated with rectifiers constituted in the case of each winding by two rectifiers 158 and 160 (constituted, for example, by silicon diodes in cascade). These diodes are connected in a Graetz bridge by means of connections which are attached to the beam (but not visible in the figures) and serve to put the different cells in series. Provision can evidently be made for smoothing capacitors and balancing resistors.

The rods 104 and 106 and the return conductor 108 are coupled to the generator 161 having an alternating-current supply by means of three transformation windings 162, 164 and 166 mounted on a magnetic frame (not shown) which is placed beneath the tank and surrounds the rods. The generator 161 can comprise an autotransformer which makes it possible to regulate the output high-voltage.

Assembly and disassembly of the device which has just been described, for example in order to replace a defective cell, are extremely simple. For example, when it is desired to gain access to the cell 114l, the initial operation consists in removing the tank. The stack of cells supported by the beam then rests on the bottom wall 102. The rods 104 and 106 are withdrawn by pulling these latter upwards. The cover 144 of the beam, the high-voltage dome 150 and the equipotential rings 114m and 114l are then removed. It is then only necessary to disconnect the cell 114l and then to withdraw this latter by causing its support plate to slide within the grooves of the beam. A new cell is then introduced in the place of the first, the connections are re-established, the equipotential rings are again fitted in position; finally, the other elements are put back in place and the tank is closed.

It is apparent that the device makes it possible to achieve all the results which are sought. The absence of solid insulating material on the rods removes any danger of creeping. There is no problem of shaping of rods since these latter are rectilinear and can be solid since cooling is carried by the gas which is in direct contact with the metal. The transverse dimensions for the same direct-current voltage difference, which are greater in the case of gaseous insulation than in the case of solid insulation, make it possible to increase the intensity of the alternating current which passes within the rods and therefore the intensity of the high-voltage direct-current supplied. The insulating support beam 134 serves to dispense with the need for a member which applies pressure to the cells placed between the dome and the tank in order to maintain the stack and for insulating members on which creeping is difficult to control.

The invention is obviously not limited solely to the modes of execution which have been described in detail by way of example and it must be understood that the scope of the present Addition extends to alternative forms of either all or part of the arrangements described which remain within the definition of equivalent means. In particular, the transformers 162, 164 and 166 can be located within the interior of the tank, the primary windings of said transformers being fed, for example from the general supply mains, by means of supply leads which pass through the bottom wall 102.

What we claim is:

1. A device for producing a large direct-current potential difference from an alternating-current source, comprising: a transfer winding supplied by said source; and a plurality of cells each comprising a secondary winding coupled inductively to said transfer winding and a rectifier circuit supplied by said secondary winding, the outputs of the rectifiers of said cells being placed in series, wherein said device comprises at least one conductive rod forming said transfer winding and connected to a low-voltage alternating-current supply, said cells being arranged in tiers along the conductive rod or each conductive rod and each cell being provided with a closed magnetic-circuit body around each rod, said secondary winding having a large number of turns and mounted on said magnetic-circuit body, and wherein each cell constitutes a module comprising a support plate provided with a set of aligned perforations through which the primary conductive rod or rods are permitted to pass.

2. A device according to claim 1, wherein the rod or each rod has a hairpin shape and is provided with an electric insulator and wherein each plate is provided with a second set of perforations for the insertion of rods which serve to align the plates and are isolated therefrom, and wherein provision is made for compression means whereby said support plates which are separated by isolating spacer members are clamped together and against a base support fitted with leak-tight lead-in bushings for the ends of each arm of one conductive rod, said base support being such as to constitute the bottom of a tank which surrounds the cells and contains an electrically insulating gas.

3. A device according to claim 1, wherein said device comprises two conductive rods provided with an electrical insulator and shaped so as to form an open loop with two arms each having a free extremity, two free extremities each forming part of one loop being connected to each other and to one of the poles of a three-phase low-voltage supply whilst the two other poles thereof are connected respectively to the two remaining free extremities, said cells being arranged in tiers along each conductive rod and each cell being provided with a magnetic-circuit body coupled to the assembly of arms and three secondary windings having a large number of turns mounted on said magnetic-circuit body, the body of each magnetic circuit being at the potential of one point of the rectifier which is associated therewith.

4. A device according to claim 3, wherein each cell constitutes a module comprising a support plate provided with a first set of aligned perforations through which are permitted to pass the two arms of each conductive rod forming a primary and with a second set of perforations for the insertion of support-plate alignment rods which are isolated from the support plates and wherein provision is made for compression means whereby said support plates located by means of isolating spacer members are clamped together and said plates are applied against a base support fitted with leak-tight lead-in bushings for the free ends of all the arms, said base support being intended to constitute a bottom wall of the tank.

5. A device according to claim 4, wherein the compression means comprise a pressure ring for producing action on the support plate located at the greatest distance from the free extremities of each conductive hairpin rod and tie-rods placed between the base support and said support plate.

6. A device according to claim 5, wherein the support plates are metallic and fitted with a guard ring.

7. A device according to claim 6, wherein the base support which forms the bottom tank wall is of non-magnetic metal.

8. A device according to claim 7, wherein the base support forming the bottom tank wall is rigidly fixed to a frame forming an extension of the tank, said frame being employed as a support for a rod-supply transformer.

9. A device according to claim 8, wherein each support plate carries a silicon-diode rectifier, a smoothing capacitor and protective resistors.

10. A device according to claim 2, wherein said device comprises high-power protective resistors each placed between two successive support plates.

11. An electric generator according to claim 2, wherein said generator comprises capacitors having a capacitance of several hundred picofarads each interposed between two successive plates at least between the plates which are at the highest potentials.

12. A device according to claim 4, wherein said device comprises a leak-tight high-voltage lead-in bushing through a cover of the tank.

13. A device according to claim 4, wherein the support plates have aligned perforations for the insertion of an insulating tube containing a high-voltage conductor and constituting a high-voltage passage through the bottom wall of the tank.

14. A device for producing a large direct-current potential difference from an alternating-current source, comprising: a transfer winding supplied by said source; and a plurality of cells each comprising a secondary winding coupled inductively to said transfer winding and a rectifier circuit supplied by said secondary winding, the outputs of the rectifiers of said cells being placed in series, wherein said device comprises at least one straight bare rod of material having good electrical conductivity, said rod being contained at least partially within a leak-tight tank which is intended to receive a gas having high dielectric strength and constituting together with a solid bare return conductor said primary transfer winding having a single loop and connected to a low-voltage alternating-current supply; said cells being arranged in tiers along the bare rod, each cell comprising a closed magnetic-circuit body around the rod or each rod and at least one secondary winding having a large number of turns and mounted on said magnetic-circuit body.

15. A device according to claim 14, wherein each cell constitutes a module which can be removed as a single unit and comprises a support plate provided with a perforation (or a set of perforations) enabling the rod or rods to pass therethrough and having a sufficient diameter to enable the gas ring between the rod and the support plate to ensure insulation at the output voltage of the device.

16. A device according to claim 15, wherein said device comprises a shielding ring carried by each support plate around the rod or around each rod.

17. A device according to claim 15, wherein the modules are carried by a beam of insulating material which is secured to one of the walls of the tank and has a cross-section in the shape of an inverted U, the bottom of which is parallel to the rod or rods.

18. A device according to claim 17, wherein the support plate of each cell engages in support grooves of the insulating beam.

19. A device according to claim 18, wherein each cell comprises an equipotential ring placed around the beam and connected to the corresponding plate by means of retaining push-rods extending through the beam.

20. A device according to claim 19, wherein the beam has a removable insulating cover which is parallel to the end-wall and serves to retain the cell plates within the beam.

21. A device according to claim 20, wherein the rod or rods is or are removable in the upward direction in order to withdraw the cells independently of each other by sliding within the grooves of the beam.

22. A device according to any one of claim 14 and having a three-phase current supply, wherein said device comprises two bare conductive rods, each cell being provided with three secondary windings each placed around one arm of a magnetic circuit which completely surrounds the two rods, the return of alternating current being effected through a conductor which is connected to the rods.

23. A device according to claim 22, wherein the conductor is connected to the rods by a conductive yoke placed within the tank above the stack of cells.

* * * * *